United States Patent [19]

Girard

[11] Patent Number: 4,736,336
[45] Date of Patent: Apr. 5, 1988

[54] ASYNCHRONOUS DEMAND SELECTOR WITH MULTI-TAPE DELAY LINE

[75] Inventor: Paul M. Girard, Versailles, France

[73] Assignee: Bull, S.A., Paris, France

[21] Appl. No.: 812,922

[22] Filed: Dec. 23, 1985

Related U.S. Application Data

[63] Continuation of Ser. No. 460,562, Jan. 24, 1983, abandoned, which is a continuation of Ser. No. 186,443, Sep. 12, 1980, abandoned.

[30] Foreign Application Priority Data

Sep. 12, 1979 [FR] France .................... 79 22745

[51] Int. Cl.⁴ .................. G06F 13/14; G06F 13/18
[52] U.S. Cl. .................................................. 364/900
[58] Field of Search ... 364/200 MS File, 900 MS File; 377/76; 328/103, 152, 55, 56

[56] References Cited

U.S. PATENT DOCUMENTS

| | | | |
|---|---|---|---|
| 3,247,492 | 4/1966 | Furlong | 364/200 |
| 3,543,242 | 11/1970 | Adams, Jr. et al. | 364/200 |
| 3,889,237 | 6/1975 | Alferness et al. | 364/200 |
| 3,921,145 | 11/1975 | Emm et al. | 364/200 |
| 4,085,444 | 4/1978 | Schneider | 364/900 |
| 4,090,238 | 5/1978 | Russo | 364/200 |
| 4,153,934 | 5/1978 | Sato | 364/200 |
| 4,162,529 | 7/1979 | Suzuki et al. | 364/200 |
| 4,200,912 | 4/1980 | Harrington et al. | 364/200 |
| 4,241,418 | 12/1980 | Stanley | 364/900 |
| 4,449,183 | 5/1984 | Flahive et al. | 364/200 |

FOREIGN PATENT DOCUMENTS

| | | | |
|---|---|---|---|
| 2465269 | 3/1981 | France . | |
| 1579224 | 11/1980 | United Kingdom | 364/200 |

OTHER PUBLICATIONS

Barna et al., "Integrated Circuits in Digital Electronics", Published by John Wiley & Sons, 1973, pp. 161-167.

Joseph D. Greenfield, "Practical Digital Design Using ICs", Published by John Wiley & Sons, 1977, 1983, pp. 165-166.

*Primary Examiner*—Raulfe B. Zache
*Assistant Examiner*—Thomas C. Lee
*Attorney, Agent, or Firm*—Lowe, Price, LeBlanc, Becker & Shur

[57] ABSTRACT

A data processor asynchronous demand selector includes a time selector for selecting an asynchronous demand according to the time it is applied to the selector. A spatial selector controls each demand selected by the time selector according to a predetermined, arbitrary criterion. A temporary clock responds to the time selector to derive synchronization signals which are applied to the time and spatial selectors. The temporary clock also supplies synchronization signals having occurrence times determined by the time of the selected demand to a common resource member for the various units of the system, e.g., a data memory that is selectively refreshed, or has data written into or read from it.

3 Claims, 5 Drawing Sheets

ASYNCHRONOUS DEMAND SELECTOR WITH MULTI-TAPE DELAY LINE

This is a continuation of Ser. No. 460,562 filed 1-24-83, which was a continuation of Ser. No. 186,443 filed 9-12-80, both now abandoned.

TECHNICAL FIELD

The present invention relates generally to an asynchronous demand selector for a data processing system and, more particularly, to a demand selector including a time selector responsive to demands of various units in the system, which time selector controls a spatial selector and a temporary clock.

BACKGROUND ART

A data processing system includes a number of devices, typically processing units, data input and output units, a memory unit, and exchange units. Each of the units is allocated a specific task. Each of the processing units, which in modern systems have a tendency to be microprocessors, execute programs that manipulate data. The exchange unit of a system insures transmission of data between the input and output units, processing units, and the memory unit. The memory unit, in addition to storing data, stores programs which control the operation of the input and output units, as well as the processing units and the exchange unit. The processing units, as well as the input-output units, may have internal memories.

In a completely coherent system, the various processing units, memory units, and input-output units communicate or dialogue with each other. Depending on the size or power of the system, either a synchronous or asynchronous communication system is employed. Asynchronous communications are particularly reserved for large, high-power systems for several reasons. The principal reasons are: (1) the relatively great distance between units, which results in lengthy transmission times for signals between units, and (2) to enable independent development of the various units which are spaced in time and/or in different places. The relatively lengthy transmission times make it difficult to check the synchronization of the signals arriving at the different units.

Because of these factors, each of the units has an independent clock, and, therefore, functions asynchronously with respect to the other units. Also, some of the units inherently do not have any clock at all, or may operate at different frequencies and/or phase with respect to each other. Thus, the clock frequency of the different units are not synchronized to each other, with regard to frequency and/or phase. The units which do not include a permanent periodic clock, i.e., asynchronously controlled units, must be controlled by a common system clock. In the case of asynchronously controlled units, the communication between different units, i.e., the exchange of data or control signals between them, can only begin after the synchronized starting of a temporary clock with a signal coupled between the asynchronous units.

In currently known systems, the synchronized starting of the various units in an asynchronous data processing system is performed with flip-flops or Schmidt triggers. However, operational risk generally exists with a poorly defined failure rate in these prior art systems. The poorly defined failure rate occurs particularly for asynchronously controlled units, i.e., units that do not have a permanent clock, because such units are likely to be activated into operation by plural trigger demands that occur completely asynchronously with respect to each other. Operating risks occur when such trigger demands occur approximately simultaneously.

It is, therefore, an object of the present invention to provide a new and improved apparatus for controlling asynchronously operated units of a data processing system.

Another object of the invention is to provide a new and improved asynchronous demand selector that insures activation of an asynchronous control member without operating risk and with a predetermined success ratio, even in response to asynchronous, different trigger demands from other units.

THE INVENTION

In accordance with the present invention, an asynchronous demand selector selects asynchronous demands which are presented to it by units of a data processing system by triggering on a first demand, or demands which are supplied to it simultaneously or approximately simultaneously, without being affected by later occurring demands. After an operating cycle is executed in response to the demand which activates the selector, the selector resumes a rest state until it is again activated by a new, next trigger demand. If a next trigger demand occurs a predetermined time interval after the first trigger demand, but before the operating cycle has been completed, the next trigger demand is decoupled from the demand selector and is coupled to the selector after the operating cycle has been completed. If a plurality of such trigger demands occur before the cycle time has been completed, the demands are simultaneously coupled to the demand selector after the cycle time has been completed. One of the simultaneously coupled demands is selected on a predetermined priority basis. If two successive trigger demands occur within less than the predetermined time interval, there is an uncertainty as to which will be selected. Because all of the demands, however, are supplied to a central asynchronous demand selector, having virtually identical units with extremely short delay times, the uncertainty time of two such approximately simultaneously arriving pulses, as a function of time, is a precisely known function.

More particularly, the asynchronous demand selector according to the invention, includes a time selector for selecting an asynchronous demand according to the time it is applied to the selector. A spatial selector controls each demand selected by the time selector according to a predetermined, arbitrary criterion. A temporary clock responds to the time selector to derive synchronization signals which are applied to the time and spatial selectors. The temporary clock also supplies synchronization signals having occurrence times determined by the time of the selected demand on the time selector to a common resource member for the various units of the system, e.g., a main memory unit that stores programs which control the processing units and the exchange unit or a data memory that is selectively refreshed, or has data written into or read from it.

The above and still further objects, features and advantages of the present invention will become apparent upon consideration of the following detailed description of several specific embodiments thereof, especially when taken in conjunction with the accompanying drawings.

BEST MODE FOR CARRYING OUT THE INVENTION

Figure 1:
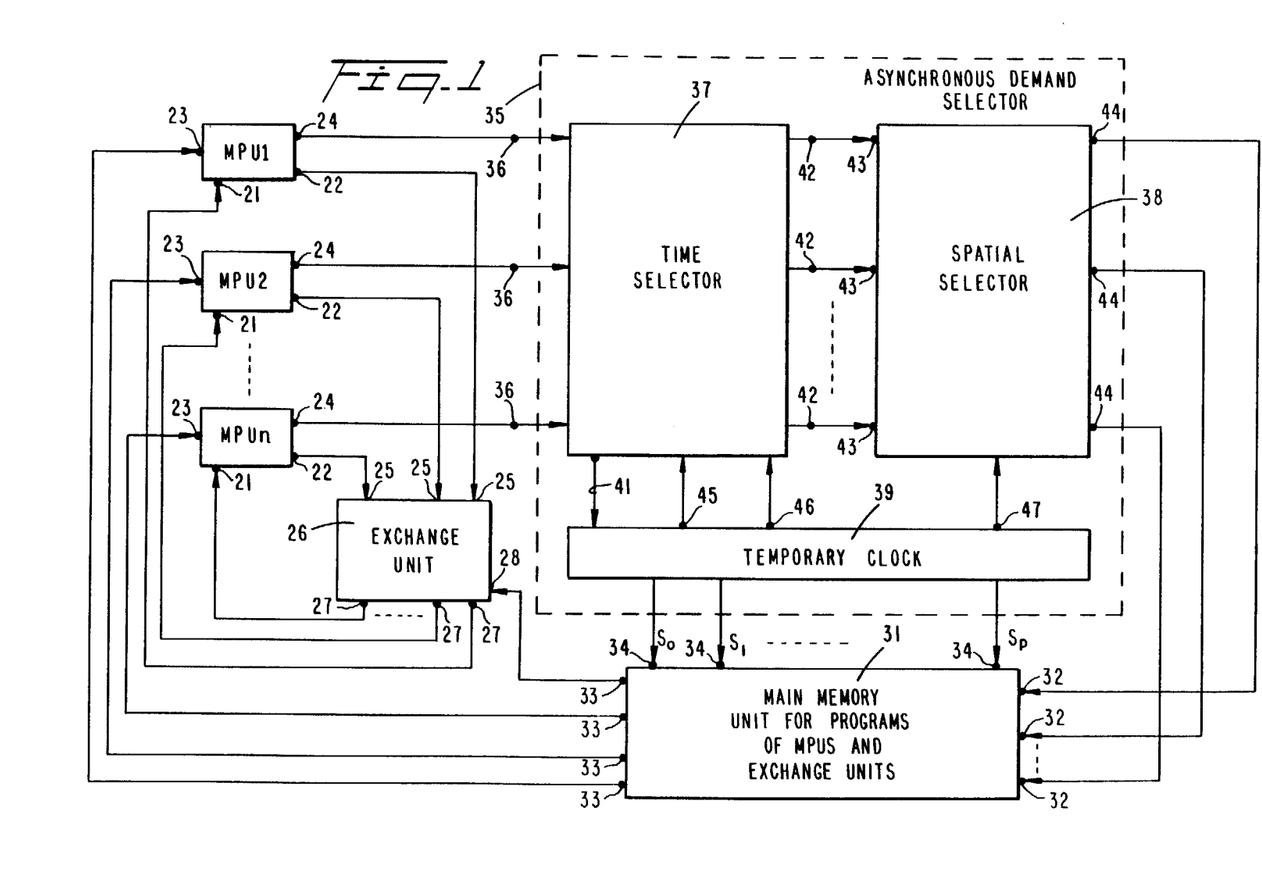
FIG. 1 is a block diagram of a system including an asynchronous demand selector according to a preferred embodiment of the invention.

Reference is now made to FIG. 1 of the drawing wherein there are illustrated a plurality of asynchronous microprocessor units MPU1, MPU2 . . . MPUn, each having a data input terminal 21, a data output terminal 22, a control input terminal 23, and a demand output terminal 24. When a particular unit makes a demand, a binary one signal is derived on terminal 24; the binary one level remains on terminal 24 until the demand has been executed, at which time the microprocessor receives a control signal that causes the demand signal on terminal 24 to return to a binary zero level. In a preferred embodiment, microprocessor units MPU1, MPU2 . . . MPUn are 8080 Intel microprocessors, or a microprocessor as disclosed in U.S. Pat. No. 3,400,371. It is to be understood, however, that other types of microprocessors can be utilized, and/or that some of microprocessors MPU1, MPU2 . . . MPUn can be replaced by a suitable input-output device, such as a keyboard, printer or cathode ray tube display.

The data output signals at terminals 22 of MPU1, MPU2 . . . MPUn are coupled to data input terminals 25 of data exchange unit 26, having data output terminals 27, which are coupled to data input terminals 21 of microprocessor units MPU1, MPU2 . . . MPUn. Exchange unit 26 also includes a control input terminal 28 that determines the connections between data input terminals 25 and data output terminals 27.

The system of FIG. 1 also includes a main memory unit 31 in which are stored programs that control the operation of microprocessor units MPU1, MPU2 . . . MPUn. Preferably, memory unit 31 stores external programs for microprocessor units MPU1, MPU2 . . . MPUn, i.e., programs that control the coupling of data between the various microprocessing units and a main data memory unit (not shown). Preferably, main memory unit 31 is a metal oxide semiconductor (MOS), semiconductor memory having n input terminals 32, one for each of microprocessor units MPU1, MPU2 . . . MPUn. Memory 31 includes several control output terminals 33, one for each of the microprocessor units, as well as one terminal for each of exchange unit 26 and the data memory unit (not shown). Different output terminals 33 are connected to the control input terminals 23 of microprocessor units MPU1, MPU2 . . . MPUn and to control input terminal 28 of exchange unit 26. Selection of one of the programs of main memory unit 31 is in response to a binary one signal on one of the input terminals 32 of the main memory unit. Main memory unit 31 also includes timing input terminals 34, responsive to sequentially derived timing or clock signals $S_0, S_1 \ldots S_p$. In response to signals $S_0, S_1 \ldots S_p$, main memory unit 31 is stepped through the programs stored therein. After the particular program within main memory unit 31 has been selected, the various states of the program are reached in sequence, in response to the derivation of sequential signals $S_0, S_1 \ldots S_p$.

Activation of a selected input terminal 32 of main memory unit 31 and derivation of sequential timing signals $S_0, S_1 \ldots S_p$ is provided by asynchronous demand selector 35, which forms the basis of the present invention. Asynchronous demand selector 35 includes n input terminals 36, one for each of the demand output terminals 24 of microprocessor units MPU1, MPU2 . . . MPUn. Terminals 36 are respectively responsive to signals $D0, D1 \ldots Dn$, respectively derived from microprocessor units MPU1, MPU2 . . . MPUn. Selector 35 responds to demand signals $D0, D1 \ldots Dn$ in such a manner that the first demand signal effectively seizes control of the selector. Thereby, the demand signal which seizes control of selector 35 causes the memory for the corresponding microprocessor unit to be seized in main memory unit 31. In addition, the demand signal which seizes control of asynchronous demand selector 35 causes timing signals $S_0, S_1 \ldots S_p$ to be derived in sequence, at a predetermined frequency.

If plural demand signals occur during the interval while timing signals $S_0, S_1 \ldots S_p$ are being derived in response to the first received demand signal, the subsequently received demand signals are decoupled from asynchronous demand selector 35, if they follow after the first demand signal at a time interval greater than a predetermined duration. If plural signals occur during the interval while signals $S_0, S_1 \ldots S_p$ are being derived in response to the first demand signal, the plural signals are simultaneously handled by the demand selector after derivation of all the timing signals associated with the first demand signal. One of the simultaneously handled demand signals is selected for control of memory unit 31 in accordance with a predetermined criterion. If two demand signals occur substantially simultaneously, in an interval less than the predetermined interval, only one of the demand signals is handled at a time and the other one is processed after the selected demand has been processed. Such a situation results in an uncertainty time by the system for selection of demands that occur at almost the same time. The uncertainty time is a predetermined function based on the stabilization time of certain components within asynchronous demand selector 35. Thus, the system, when operated in connection with asynchronous demand selector 35, has a predetermined forseeable success rate.

Asynchronous demand selector 35 includes a time selector 37, a spatial selector 38, and a temporary clock 39. Time selector 37 includes a number of demand input terminals, connected to terminals 36. The demand input terminals of time selector 37 are respectively responsive to asynchronously derived demand output signals at output terminals 24 of microprocessors MPU1, MPU2 . . . MPUn. Time selector 37 responds to the demand signals coupled to terminals 36, so that the demand signal which is coupled first in time to terminal 36 is selected by the time selector. In response to a demand signal, time selector 37 supplies a trigger signal to temporary clock 39 by way of lead 41, to initiate operation of temporary clock 39 which derives sequential timing or clock signals $S_0, S_1 \ldots S_p$, which are spaced in time from each other by a predetermined interval.

Time selector 37 includes n output terminals 42, one for each of the microprocessor units. Time selector 37 responds to the pulses applied to terminal 36 in such a manner that a binary one signal is derived on the terminal 42 which corresponds with the signal on lead 36 selected by time selector 37.

The selection signals derived by time selector 37 on output terminals 42 are supplied to n input terminals 43 of spatial selector 38. One input terminal 43 of spatial selector 38 is provided for each of microprocessor units MPU1, MPU2 . . . MPUn. Spatial selector 38 includes n output terminals 44, one of which is provided for each of microprocessor units MPU1, MPU2 . . . MPUn. A binary one signal is derived by selector 38 on one of terminals 44 at a time. Signals supplied to terminals 44 are coupled to input terminals 32 of main memory unit 31, to seize a program in the main memory unit corresponding to the microprocessor unit which has been selected by asynchronous demand selector 35.

Spatial selector 38 can respond to several demand signals which are simultaneously coupled to terminals 43 thereof after a sequence of timing pulses $S_0, S_1 \ldots S_p$ has been derived in response to a demand signal previously supplied to selector 38. If several demand signals are simultaneously supplied to spatial selector 38, one of the demand signals is selected according to a predetermined, arbitrary criterion. The arbitrary criterion can, for example, be a predetermined or variable order criterion priority, or a selection strategy based on the sequential order of a preselected demand signal. Choice of the particular type of spatial selector is not limited in accordance with the broad principals of the invention.

To control the timing of circuitry within time selector 37 and spatial selector 38, temporary clock 39 includes a number of output terminals 45, 46 and 47, in addition to the output terminals on which clock signals $S_0, S_1 \ldots S_p$ are derived. The signals on terminals 45, 46 and 47 are derived in sequence, generally at times different from the derivation of signals $S_0, S_1 \ldots S_p$. The signals on terminals 45 and 46 sequentially activate cascaded stages in time selector 37, while the signal on terminal 47 subsequently activates circuitry in spatial selector 38, such that a binary one pulse is derived on an output terminal 44 of the spatial selector selected by the arbitrary criterion.

Figure 3:
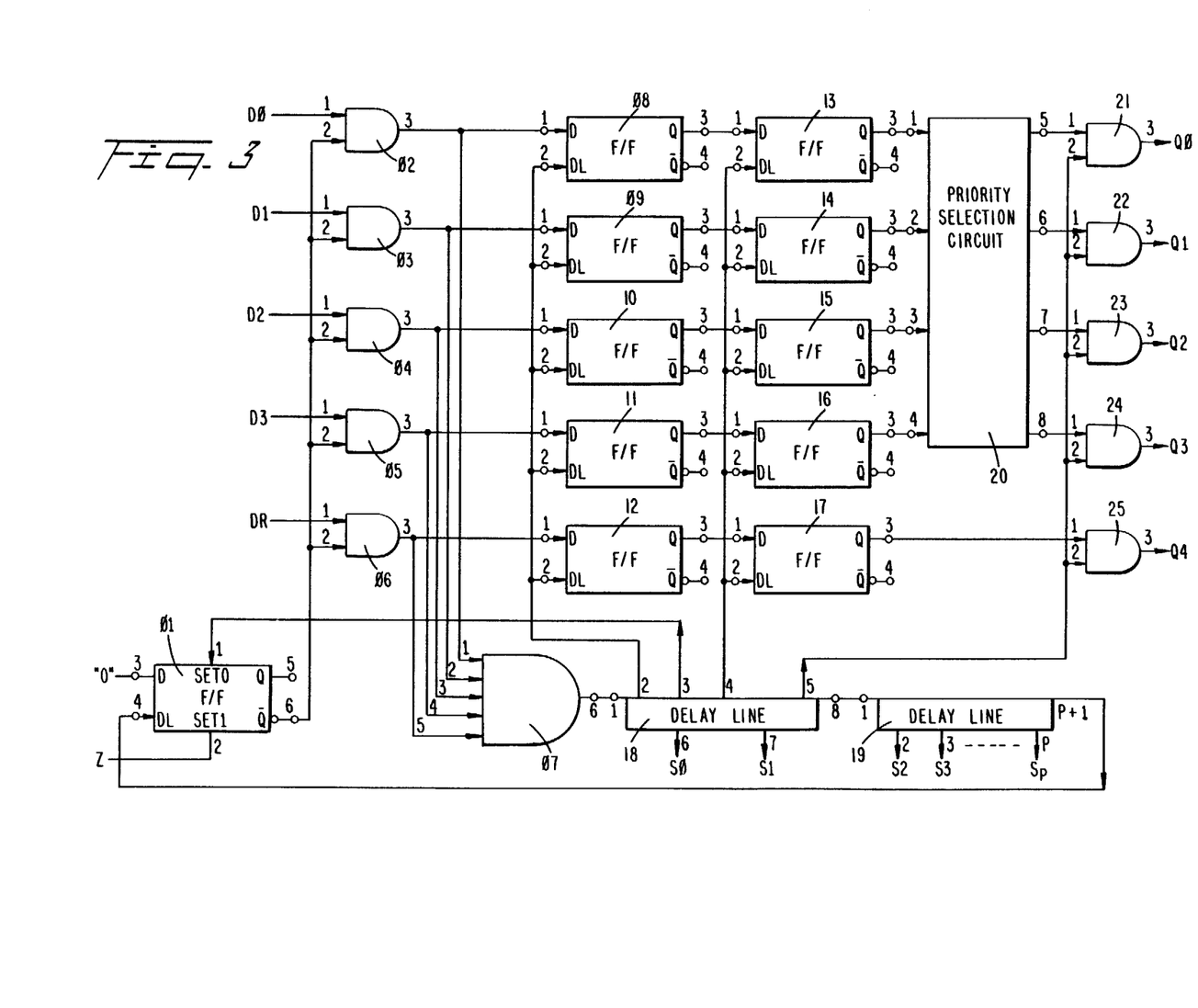

Reference is now made to FIG. 3 of the drawing, wherein there is illustrated a block diagram of a general form of asynchronous demand, i.e., command, selector 35, FIG. 1. The asynchronous demand selector of FIG. 3 is responsive to utilization or demand, i.e., command signals D0, D1, D2, D3 and DR derived from five different microprocessor units. The asynchronous demand selector of FIG. 3 responds to signals D0, D1, D2, D3 and DR to derive five different output signals Q0, Q1, Q2, Q3 and Q4 which are supplied to a main memory unit, as described in FIG. 1 in connection with main memory unit 31. In addition, the asynchronous demand selector of FIG. 3 derives (p+1) temporary time clock signals S0, S1, S2, S3 . . . $S_p$, which are supplied to a main memory unit, such as main memory unit 31, FIG. 1. The asynchronous demand selector of FIG. 3 broadly includes time selector 37, spatial selector 38 and temporary clock 39.

Time selector 37 includes five AND gates $\phi2, \phi3, \phi4, \phi5$, and $\phi6$, having input terminals 1, respectively responsive to demand signals D0, D1, D2, D3 and DR. AND gates $\phi2$–$\phi6$ supply signals to a pair of cascaded flip-flop stages. Flip-flops $\phi8, \phi9$, 10, 11 and 12, in the first stage are respectively responsive to signals from gates $\phi2$–$\phi6$. Flip-flops 13–17, in the second stage, are respectively responsive to signals from flip-flops $\phi8$–12. Each of AND gates $\phi2, \phi3, \phi4, \phi5$ and $\phi6$ includes an enable input terminal 2; each AND gate input terminal 2 is supplied in parallel with a binary one by signal by the complementary ($\bar{Q}$) signal derived at output terminal 6 of flip-flop $\phi1$.

Figure 2:
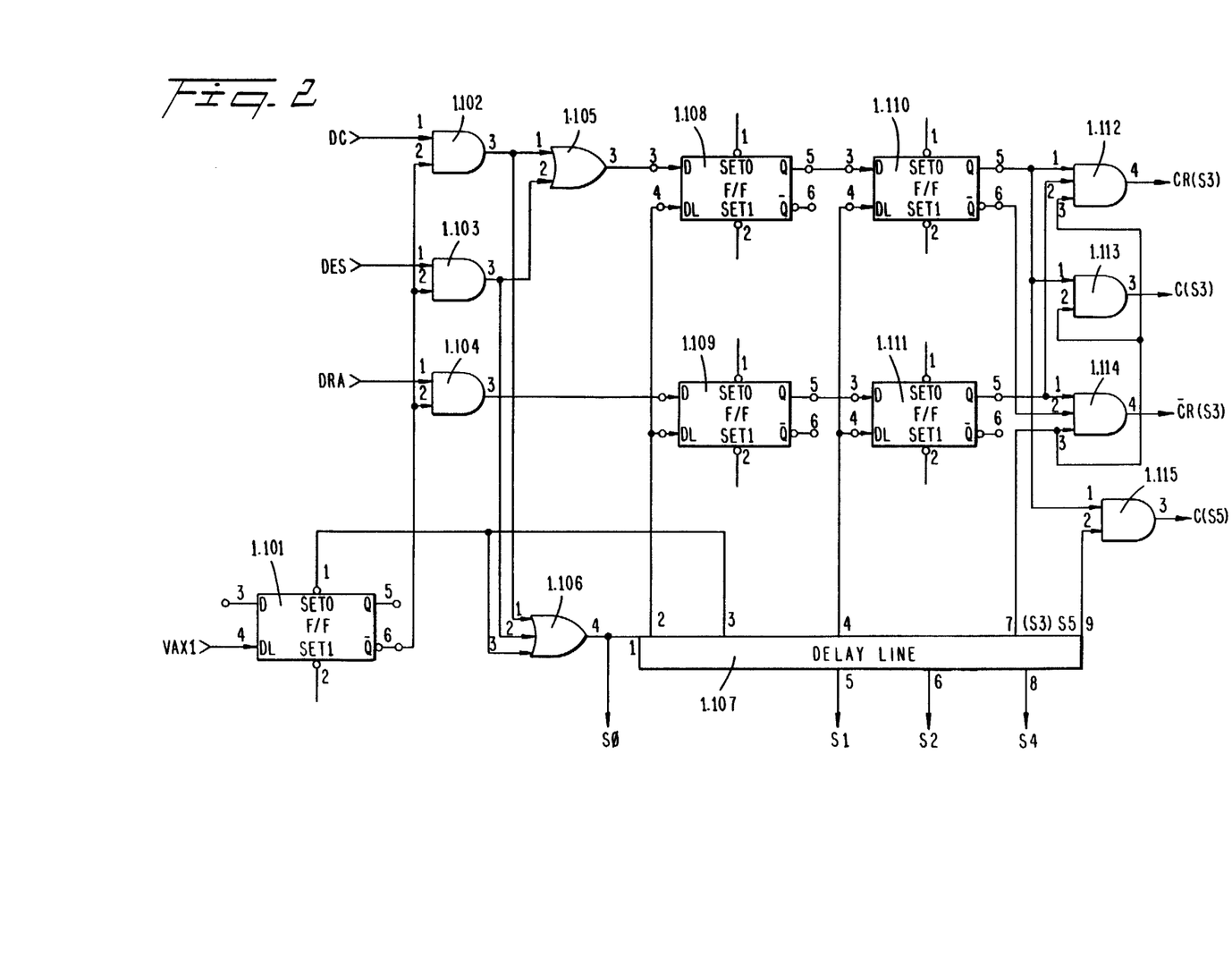
FIGS. 2 and 3 are a detailed block diagrams of first and second asynchronous demand selector embodiments according to the invention.

Flip-flop $\phi1$, as well as the remaining flip-flops illustrated in FIGS. 2 and 3, includes a data input terminal 3, a clock input terminal 4, a true (Q) output terminal 5 and a complementary ($\bar{Q}$) output terminal 6. The flip-flops are of a type such that no state change of the flip-flop occurs in response to a pulse supplied to data terminal 3. In response to coupling of the clock pulse to terminal 4 of the flip-flop, the flip-flop state is set to a one or zero level, depending upon the value of the previously applied pulse to data terminal 3. The interval between the coupling of the data and clock pulses to terminals 3 and 4 is referred to as the flip-flop preparation time. Flip-flop $\phi1$, as well as other flip-flops in the system, particularly in the FIG. 2 embodiment, include set zero and set one input terminals 1 and 2, respectively. In response to the signals applied to terminals 1, 2, 3 and 4 of flip-flop $\phi1$, the flip-flop is set to the zero and one states. With a flip-flop in the one state, binary one and zero values are respectively derived on output terminals 5 and 6 of the flip-flop; in contrast, with a flip-flop set in the zero state, binary zero and one signals are derived at output terminals 5 and 6.

Set zero input terminal 2 of flip-flop $\phi1$ is connected to be responsive to a periodic clock derived from one of the microprocessors of FIG. 3 by a suitable connection (not shown). In response to the periodic clock pulse from one of microprocessors MPU1, MPU2 . . . MPUn, flip-flop $\phi1$ is activated to a zero state, causing a binary one signal to be supplied by terminal 6 of the flip-flop to input 2 of AND gates $\phi2$, $\phi3$, $\phi4$, $\phi5$ and $\phi6$. Flip-flop $\phi1$ remains in the zero state for a predetermined time interval, discussed infra. Upon termination of the interval, set one input terminal 1 of flip-flop $\phi1$ is supplied with a binary one value by an output of temporary clock 39 whereby the flip-flop goes to the 1 state causing gates $\phi2-\phi6$ to be disabled since the output terminal 6 of the flip-flop derives a zero level. Thus, AND gates $\phi2-\phi6$ are enabled only for a predetermined time interval after a demand pulse has been coupled through one of AND gates $\phi2-\phi6$. The time interval between coupling of a binary one from one output of AND gates $\phi2-\phi6$ to the coupling of a binary one signal to input terminal 1 of flip-flop $\phi1$ is equal to the preparation time required for first stage flip-flops $\phi8-12$ within time selector 37 plus the time required for the first stage flip-flops to change state in response to a data and clock pulse sequence. After the last timing signal in a sequence of timing signals has been derived from temporary clock source 39, an output signal $S_{(p+1)}$ derived from the temporary clock is supplied to terminal 4 of flip-flop $\phi1$. Data terminal 3 of flip-flop $\phi1$ is connected to a suitable potential which causes the flip-flop to be returned to the zero state in response to the pulse supplied to terminal 4 by clock 39.

AND gates $\phi2-\phi6$, when enabled in response to a binary one level at output terminal 6 of flip-flop $\phi1$, couple demand signals D0–D3 and DR to output terminals 3 of the AND gates. Output terminals 3 of AND gates $\phi2-\phi6$ are respectively coupled to data input terminals 1 of flip-flops $\phi8$, $\phi9$, 10, 11 and 12. Flip-flops $\phi8$, $\phi9$, 10, 11 and 12 include clock input terminals 2 responsive to a timing pulse of temporary clock source 37. The clock signal supplied by source 39 to clock input terminals to flip-flops $\phi8$, $\phi9$, 10, 11 and 12 occur prior to the derivation of the first timing signal $S_0$ from the temporary clock. A clock signal supplied by temporary clock 39 in parallel to clock terminals 2 of flip-flops $\phi8$, $\phi9$, 10, 11 and 12 is delayed relative to the first demand signal coupled through AND gates $\phi2-\phi6$ by an interval equal to the preparation time of the flip-flops, whereby the flip-flop which is responsive to the earliest demand signal can respond to such demand signal.

Flip-flops $\phi8$, $\phi9$, 10, 11, and 12 have true output terminals 3, respectively connected to data input terminals 1 of flip-flops 13, 14, 15, 16, and 17. Flip-flops 13-17 include clock input terminals 2 responsive to an output signal of temporary clock 39. The signal applied to clock terminals 2 of flip-flops 13-17 occurs subsequent to the clock signals applied to flip-flops $\phi8$, $\phi9$, 10, 11 and 12 and after the clock signal applied by temporary clock 39 to input terminal 1 of flip-flop $\phi1$. The occurrence time of the signals applied to the clock terminals 2 of flip-flops 13-17 is determined in conformity with criteria described infra in connection with FIGS. 4 and 5 to provide an engagement free of operating risks. Second stage flip-flops 13-17 thus resynchronize the utilization demands coupled to first stage flip-flops $\phi8-12$. The signals derived from true output terminals 3 of flip-flops 13-17 thus are stable signals, at least one of which has a binary one value.

Temporary clock source 39 which derives timing signals $S_0-S_p$, as well as a further timing signal $S_{(p+1)}$ and the timing signals applied to terminals 45, 46 and 47, FIG. 1, includes a pair of cascaded multi-tap delay elements 18 and 19. For simplicity, delay elements 18 and 19 are indicated as multi-tap delay lines; it is to be understood, however, that the delay elements are preferably a series of cascaded astable multivibrators or Schmitt triggers, having predetermined delay times, and which derive clock signals having virtually identical wave shapes.

Delay element 18 includes an input terminal 1 on which is derived a binary one signal in response to a binary one output signal being derived by any of AND gates $\phi2-\phi6$. To this end, output terminals 3 of AND gates $\phi2-\phi6$ are coupled to input terminals 1, 2, 3, 4 and 5 of OR gate $\phi7$, having output terminal 6 that is coupled to input terminal 1 of delay element 18. Delay element 18 responds to the pulse at input terminal 1 thereof to derive timing signals in sequence on output terminals 2, 3, 4 and 5 thereof. The pulses supplied by delay element 18 to output terminals 2 and 4 thereof are coupled to clock input terminals of flip-flops $\phi8-\phi12$ and 13-17, respectively. The output pulse derived by delay element 18 on output terminal 3 thereof is applied to input terminal 1 of flip-flop $\phi1$. The output signal supplied by delay element 18 to output terminal 5 thereof is supplied as enable input to spatial selector 38.

Delay element 18 also includes output terminals 6 and 7 on which are derived timing signals $S_0$ and $S_1$, which occur subsequent to the derivation of the timing signal at terminal 5 of the delay element, in a preferred embodiment. Thereby, the first two steps in the program of main memory unit 31 positively occur after an output signal is derived on one of terminals 44 by spatial selector 38. Alternatively, the pulses supplied by delay element 18 to terminals 6 and 7 can occur prior to the derivation of the signal on output terminal 5 of element 18 if it is necessary to prepare main memory unit 31 to be responsive to sequential signals applied to one of terminals 32 thereof.

Delay element 18 includes output terminal 8, on which is derived a timing signal subsequent to all of the other timing signals derived by the delay element. The signal on output terminal 8 of delay element 18 is coupled to input terminal 1 of delay element 19, having output terminals 2, 3 ... P, (P+1). Timing signals $S_2$, $S_3$ ... $S_p$ are respectively supplied to output terminals 2, 3 ... P of delay element 19 with a predetermined spacing to provide synchronized clocking of the programs stored in main memory unit 31 and of microprocessors MPU1, MPU2 ... MPUn. Output terminal (P+1) of delay element 19 is coupled to clock input terminal 4 of flip-flop $\phi1$. The signal coupled from output terminal (P+1) of delay element 19 to clock input terminal 4 of flip-flop $\phi1$ reinitializes time selector 37, so that AND gates $\phi2-\phi6$ are enabled and can selectively pass one of demand signals D0–D3 and DR.

Spatial selector 38, illustrated in FIG. 3, is of a mixed strategy type. In particular, demand signals D0-D3 are selected according to a fixed priority, while demand signal DR is processed according to a sequential procedure. The preselected and resynchronized demand signals derived by time selector 37, at outputs 3 of flip-flops 13-16, are respectively supplied to input terminals 1-4 of priority selection circuit 20, preferably an integrated circuit chip of the type MC10165, available from Motorola. Priority selector circuit 20 responds to the signals supplied to input terminals 1-4 thereof, to feed a single binary one signal to one of output terminals 5-8 of the priority selection circuit during a cycle while signals $S_0$-$S_p$ are being derived. The internal circuitry of circuit 20 is arranged so that a binary one signal is derived on one of terminals 5, 6, 7 or 8 according to a fixed diminishing priority.

After a particular one of demand signals D0-D3 or DR has been handled by spatial selector 38, the output signal of the spatial selector associated with the demand (one of Q1-Q4) returns the flip-flops in time selector 37 associated with the particular demand to an initial state. To this end, a connection (not shown) exists between output signals Q0-Q4 of spatial selector 38 and the set 0 input terminals (not shown) 2 of flip-flops $\phi 8$-16.

The output signals at terminals 5-8 of priority selection circuit 20 as well as the output signal at terminal 3 of flip-flop 17 are selectively gated to output terminals 44 of spatial selector 38, as signals Q0-Q4, respectively. To this end, spatial selector 38 is provided with AND gates 21-24 and 25, having input terminals 1 respectively responsive to binary levels at output terminals 5-8 of priority selection circuit 20 and terminal 3 of flip-flop 17. Each of AND gates 21-25 includes an input terminal 2, driven in parallel by the timing signal at output terminal 5 of delay element 18. Thereby, all of AND gates 21-25 are driven in parallel, but only one of the AND gates is responsive at any one time, to a binary one input signal from time selector 37.

Reference is now made to FIG. 2 of the drawings, a detailed block diagram of a particular embodiment of asynchronous demand selector 35, FIG. 1. The asynchronous demand selector illustrated in FIG. 2 is particularly adapted to be utilized in connection with a microprocessor unit and an MOS memory for storing data derived from or coupled to the microprocessor unit. Hence, data are written into and read from the memory and it is necessary to refresh the memory at predetermined intervals. The asynchronous demand selector illustrated in FIG. 2 thus responds to demand microprocessor signals DC, DES, and DRA. Demand signal DC indicates that data are to be read from the data memory, signal DES indicates that data are to be written into the data memory, while signal DRA indicates that the data memory is to be refreshed.

Demand signals DC, DES and DRA are selected on a time basis by time selector 37, which activates spatial selector 38. Spatial selector 38 responds to the demand signals coupled to it by time selector 37 and clock signals from temporary clock 39 to derive one of four different output signals, namely CR(S3), C(S3), $\overline{CR}$(S3), and C(S5). Each of signals CR(S3), C(S3), and $\overline{CR}$(S3) is derived at the same relative time in each cycle, i.e., when timing signal S3 is derived from temporary clock 39. In contrast, signal C(S5) is derived at a later relative time during each cycle, when timing signal S5 is derived. Signal CR(S3) is derived when data are to be written into or read from the memory and a refresher cycle is to be performed on the memory. In contrast, signal $\overline{CR}$(S3) is derived when a refresher cycle is to be performed on the memory, but no data are to be written into or read from the memory. Signals C(S3) and C(S5) are derived when data are to be written into or read from the memory but no refresher cycle is performed on the memory. Demand signals DC and DES, because they involve reading data from or writing data into the memory, are referred to as useful cycle demand signals.

The sequences involved in writing, reading and refreshing operations on a memory, in particular, a metal oxide semiconductor memory, are well-known to those skilled in the art. A description of such sequences is therefore not necessary for a complete description of the present invention. A description of the write, read and refresher sequences can be found in the book entitled "Structure and Control of Computers", Chapter 4, pages 101-114, published by Larousse, written by Jean Pierre Meinadir, or the book entitled, "Microprocessors", published by Sybex, and written by Rodney Zaks and Pierre Le Beau.

Time selector 37, in the embodiment of FIG. 2, includes three AND gates 1.102, 1.103, and 1.104, each having an input terminal 1 respectively responsive to demand signals DC, DES, and DRA. Signals DC, DES and DRA are, in the embodiment of FIG. 2, derived from a single microprocessor unit or from plural units which are supplying and receiving data signals from a common data memory. Each of AND gates 1.102, 1.103 and 1.104 includes a second input terminal 2, which is driven in parallel by enabling signals from output terminal 6 of flip-flop 1.101. A binary one enabling signal is derived on output terminal 6 of flip-flop 1.101 in response to a periodic pulse signal VAX 1 applied to clock input terminal 4 of the flip-flop having a positive going transition. Signal VAX 1 is derived from a clock source in a processor, with which the device of FIG. 2 is connected.

With AND gates 1.102, 1.103 and 1.104 enabled in response to a binary one signal from terminal 6 of flip-flop 1.101, binary one values for signals DC, DES and DRA are respectively coupled to output terminals 3 of AND gates 1.102, 1.103 and 1.104. The output signals of AND gates 1.102, 1.103, and 1.104 trigger temporary clock source 39 and are applied to a pair of cascaded flip-flop stages in time selector 37. The first stage of cascaded flip-flops includes flip-flops 1.108 and 1.109, while the second cascaded flip-flop stage includes flip-flops 1.110 and 1.111.

A binary one signal is supplied to data input terminal 3 of flip-flop 1.108 in response to a useful cycle being demanded by one of signals DC or DES for the data memory controlled by the asynchronous demand selector of FIG. 2. In other words, in response to a demand, i.e., command, signal that data be written into or read from the memory, a binary one signal is applied to data input terminal 3 of flip-flop 1.108. To this end, output terminals 3 of AND gates 1.102 and 1.103 are respectively applied to input terminals 1 and 2 of OR gate 1.105, having an output terminal 3 that is directly coupled to data input terminal 3 of flip-flop 1.108. If the data memory being controlled by the asynchronous demand selector of FIG. 2 is to be refreshed, a binary one signal is derived from output terminal 3 of AND gate 1.104 and applied directly to data input terminal 3 of flip-flop 1.109. A predetermined time after binary one signals have been applied to data terminal 3 of flip-flop 1.108 and/or flip-flop 1.109, which time is slightly greater than the preparation time for the flip-flops, a clock signal is supplied in parallel to clock terminals 4 of flip-flops 1.108 and 1.109 by terminal 45 of temporary clock 39. Thereby, binary one and zero levels are derived on true output terminals 5 of flip-flops 1.108 and/or 1.109, as a function of the values of the data pulses applied to input terminals 3 of the flip-flops immediately preceding the occurrence of clock pulses applied to terminals 4 of the flip-flops.

The binary values on terminals 5 of flip-flops 1.108 and 1.109 are coupled to data input terminals 3 of flip-flops 1.110 and 1.111, respectively. Subsequently, clock signals are applied in parallel to clock input terminals 4 of flip-flops 1.110 and 1.111 by output terminal 46 of temporary clock 39. Flip-flops 1.110 and 1.111 respond to the signals applied to terminals 3 and 4 thereof to derive output signals which indicate whether a useful cycle and/or a refresher cycle is to be performed on the memory that is controlled by the asynchronous demand selector of FIG. 2. To this end, flip-flop 1.110 includes true and complementary output terminals 5 and 6 on which are respectively derived signals C and $\overline{C}$ which respectively indicate that a useful cycle is and is not to be performed on the memory. Flip-flop 1.111 includes output terminal 5 on which is derived signal R, having a binary one value when a refresher cycle is to be performed. Signals C, $\overline{C}$, and R are applied to spatial selector 38 and are read from the spatial selector subsequently, in response to signals derived from temporary clock souce 39.

Temporary clock source 39 includes a delay element, as described supra with regard to FIG. 3, having multiple output taps, as well as an input terminal 1. A pulse is applied to input terminal 1 of delay element 1.107 in response to an output signal being derived at output terminal 3 of any of AND gates 1.102, 1.103 or 1.104. In other words, a pulse is applied to input terminal 1 of delay element 1.107 any time a demand signal is coupled into time selector 37. To this end, output terminals 3 of AND gates 1.102, 1.103 and 1.104 are respectively supplied to input terminals 1, 2 and 3 of OR gate 1.106, having an output terminal 4 that is directly coupled to input terminal 1 of delay element 1.107. Output terminal 4 of OR gate 1.106 also establishes the first timing signal S₀ from temporary clock source 39.

Delay element 1.107 includes intermediate taps 2-8, and an output tap 9. Tap 2 of delay element 1.107 is directly coupled to the clock input terminal 4 of each of flip-flops 1.108 and 1.109. The delay time of a pulse propagating between input terminal 1 and tap 2 of delay element 1.107 is slightly in excess of the preparation time of flip-flops 1.108 and 1.109. After a timing signal has been derived at tap 2 of delay element 1.107, a timing signal is derived from tap 3 of the delay element and supplied to input terminal 1 of flip-flop 1.101. The timing signal applied to terminal 1 of flip-flop 1.101 returns the flip-flop to a 0 state, whereby AND gates 1.102, 1.103 and 1.104 are disabled until periodic pulse VAX 1 is again derived. A predetermined time interval after a timing signal is derived at tap 3 of delay element 1.107, a timing signal is derived at tap 4 and coupled in parallel via terminal 46 to clock terminals 4 of flip-flops 1.110 and 1.111. As described supra, the pulse derived from terminal 4 of temporary clock 39 synchronizes flip-flops 1.110 and 1.111 to be responsive to pulses derived from flip-flops 1.108 and 1.109, and coupled to data input terminals 3 of flip-flops 1.110 and 1.111.

Subsequent to the derivation of the timing signal on terminal 4 of delay element 1.101, the delay element derives two additional timing signals which are spaced from each other in time by a predetermined interval. In particular, delay element 1.107 derives timing signals S3 and S5 from output taps 7 and 9 thereof, respectively. Signals S3 and S5 are applied to spatial selector 38 to enable certain signals which are applied to the spatial selector by time selector 37 to be derived at different times.

Delay element 1.107 also derives timing signals S1, S2 and S4 on taps 5, 6 and 8. Generally, signals S1 and S2 occur between the signals derived from taps 4 and 7 of delay element 1.107, while signal S4 is derived between the occurrence times of timing signals S3 and S5. Signals S0, S1, S2 and S4 are clock signals that are applied to the memory being controlled by the asynchronous demand selector illustrated in FIG. 2.

Spatial selector 38, in the embodiment of FIG. 2, includes AND gates 1.112, 1.113, 1.114 and 1.115 which are responsive to signals C, $\overline{C}$ and R as derived at output terminals of flip-flops 1.110 and 1.111. Gates 1.112-1.115 respond to signals C, $\overline{C}$ and R to selectively derive, at the occurrence time of signal S3, signals CR(S3), C(S3), and $\overline{C}$(S3); at the occurrence time of timing signal S5, spatial selector 38 derives signal C(S5).

To this end, AND gates 1.112, 1.113 and 1.114 include input terminals 1, driven in parallel by signal C, at output terminal 5 of flip-flop 1.110. AND gates 1.112, 1.113 and 1.114 include input terminals 1, 2 and 3, respectively driven in parallel by signal S3, derived from terminal 7 of delay element 1.107, while AND gate 1.115 includes input terminal 2, responsive to signal S5, as derived from output terminal 9 of delay element 1.107. Signal R at output terminal 5 of flip-flop 1.111 is supplied in parallel to input terminal 1 of AND gate 1.114 and input terminal 2 of AND gate 1.112. Also, signal $\overline{C}$ at output terminal 6 of flip-flop 1.110 is applied to input terminal 2 of AND gate 1.114. Thereby, signal CR(S3) is derived from output terminal 4 of AND gate 1.112, signal C(S3) is derived from output terminal 3 of AND gate 1.113, signal $\overline{C}$R(S3) is derived from output terminal 4 of AND gate 1.114 and signal C(S5) is derived from output terminal 3 of AND gate 1.115. As described supra, signals CR(S3), C(S3), $\overline{CR}$(S3) and C(S5) are applied as control signals to a data memory being controlled to determine if the data memory is to perform a useful cycle, i.e., a read or write data cycle, and/or a refresher cycle. The control signals derived from spatial selector 38, as well as the timing signals $S_0$–$S_4$ control the operations and sequencing, respectively, of the data within the data memory. If a useful cycle is performed and no refresher cycle is being performed, two control signals are supplied by spatial selector 38 to the memory at discrete times, as indicated by signals C(S3) and C(S5).

The asynchronous demand selector illustrated in FIG. 2 operates as follows:

Flip-flop 1.101 is periodically initialized or reinitialized so that a binary one signal is derived on output terminal 6 thereof in response to a pulse supplied to set input 2 thereof or in response to VAX 1, supplied to clock input 4 thereof. Simultaneously with flip-flop 1.101 being reinitialized by a pulse on set input 2 thereof, flip-flops 1.108–1.111 are reinitialized in response to a pulse supplied to set inputs 2 thereof. In response to a binary one signal being derived on output terminal 6 of flip-flop 1.101, demand signals DC, DES and/or DRA are transmitted directly via AND gates 1.102, 1.103 and 1.104 to inputs 1, 2 and 3 of OR gate 1.106. Demand signals DC and DES are transmitted directly by way of AND gates 1.102 and 1.103 to inputs 1 and 2 of OR gates 1.105, and thence to data input 3 of flip-flop 1.108 as a useful cycle demand. Data input terminal 3 of flip-flop 1.109 is responsive to demand signal DRA, as coupled through AND gate 1.104. In response to the outputs of AND gate 1.104 or OR gate 1.105, data input terminal 3 of flip-flop 1.108 and/or flip-flop 1.109 is supplied with a binary one signal. The binary one signal has a positive going transition that is delayed by the propagation time of the intermediate logic gates, i.e., gates 1.102–1.105, with respect to the positive going transition of the demand signals at input terminals 36 of time selector 37. The demand signal and/or signals coupled through gates 1.102–1.104 cause a clock signal to be derived at output terminal 4 of OR gate 1.106, which clock signal is supplied to temporary clock 39 that is formed by delay line or delay element 1.107.

The starting signal for delay element 1.107 is derived from output terminal 2 of the delay element a predetermined time period after being applied to terminal 1 of the delay element. The predetermined signal propagation time between terminals 1 and 2 of delay element 1.107 is equal to the preparation time of flip-flop 1.108 or 1.109. The preparation time is equal to the time interval between the appearance of a signal occurring on data input 3 and a positive going transition of the control signal feeding clock input 4 of a particular flip-flop. The preparation time must be at least equal to a minimum value and is dependent on the technology of the particular flip-flop. The delay between input terminal 1 and output tap 2 of delay element 1.107 is therefore calculated to ensure the minimum delay time in the least favorable case for the preparation time of flip-flops 1.108 and 1.109in in the first stage of time selector 37. The minimum delay time between input terminal 1 and output terminal 2 of the delay line or element 1.107 should be greater or equal to the difference between the maximum propagation time of logic circuitry supplying a data signal, i.e., OR gate 1.105 in FIG. 2, plus the minimum preparation time of the first stage flip-flops, i.e., the preparation time of flip-flop 1.108 or flip-flop 1.109 (whichever is longer), plus the minimum propagation time of logic circuitry involved in producing the clock pulse supplied to clock terminals 4 of flip-flops 1.108 and 1.109, i.e., OR gate 1.106 in FIG. 2. The delay time introduced by the logic circuitry is determined by going back from an origin point for a particular signal to a common point for the signal which caused the subsequently derived signal to be generated. The preceding discussion is applicable to initial cycle demand signal, DC or DES for a useful cycle, or DRA for a refresher cycle, with the assumption that the demand signals occur at time intervals that are sufficiently displaced from each other to be handled by time selector 37. An analysis will be presented infra for the case where a first demand signal, either for a useful cycle (DC or DES) or a refresher cycle (DRA) occurs immediately after a previous demand signal.

In the present hypothesis, wherein there is a sufficient time interval between the derivation of the first and second demand signals, the flip-flop 1.108 or 1.109 which responds to the first demand is activated to a true or binary one logic value without any operational risk. No operational risk occurs because the separation time between the first and second demand signals is in conformance with the technical utilization rules for flip-flops 1.108 and 1.109.

The binary values stored in flip-flops 1.108 and 1.109 in response to the clock signal applied to clock terminals 4 thereof by terminal 45 of temporary clock 39 are coupled to the second flip-flop stage, constituting flip-flops 1.110 and 1.111. Flip-flops 1.110 and 1.111 store the same signal values as stored in flip-flops 1.108 and 1.109 at the occurrence time of the timing pulse supplied by tap 4 of delay element 1.107 to clock input terminals 4 of flip-flops 1.110 and 1.111. Flip-flops 1.110 and 1.111 thus constitute the output stage of time selector 37. A binary one is stored in at least one of flip-flops 1.110 and 1.111 in response to the timing signal supplied by temporary clock 39 to terminal 46. The occurrence of a binary one signal on output terminal 5 of flip-flop 1.110 and/or 1.111 defines the first operational phase of the synchronous demand selector illustrated in FIG. 2.

Consideration is now given to the situation wherein demand signals DC, DES and/or DRA are totally asynchronous, with the assumption that a first demand signal, e.g., signal DC, is followed immediately by a later demand signal, e.g., signal DRA. In such a situation, the pulse applied by the earlier demand signal DC to delay line 1.107 may not satisfy the preparation time requirements of flip-flop 1.109 relative to the later demand signal DRA. If flip-flop 1.109 is not prepared in time for receipt of demand signal DRA, the output state of flip-flop 1.109 is not immediately determined and an uncertainty condition exists for the data input of flip-flop 1.109. To determine the state of flip-flop 1.109 it is thus instead, necessary to wait a predetermined time before the state of flip-flop 1.109 is supplied to and stored in flip-flop 1.111. Thus the duration of the uncertainty condition for the data input of flip-flop 1.111 is at most equal to the sum of the preparation and maintenance times of flip-flop 1.111, a time of the order of a few nanoseconds in modern technology. In the apparatus of the present invention, the preparation and maintenance time of flip-flop 1.111 is predetermined according to a method described infra, to provide an uncertainty probability at the output of flip-flop 1.111 of less than a predetermined value which enables a known operation time to be guaranteed without risk. It is sufficient therefore to select the waiting time sufficiently large so that the device can be considered as practically free from all failure in actual usage.

Thus, in all cases, the outputs of second stage flip-flops 1.110 and 1.111, on which are derived the output signals of time selector 37, has stable states at the end of the first selection phase, i.e., the time selection phase. At least one of the output signals of the time selector has a binary one level. The asynchronously occurring utilization demand signals at the input of time selector 37 thereby are resynchronized, and occur in synchronism with output signals of temporary clock 39.

Temporary clock 39, which includes a delay element 1.107, sequentially derives timing signals S0, S1, S2, S3, S4 and S5 at predetermined, measured, equally spaced time intervals. After each cycle of the asynchronous demand selector illustrated in FIG. 2, the pulse which propagates along delay element 1.107 no longer exists and temporary clock 39 (FIG. 1) is thereby automatically at a rest condition until the next cycle begins. The timing signal at output terminal 3 of delay line 1.107 supplies a return to zero pulse to flip-flop 1.101, whereby a binary zero level is derived at output terminal 6 of the flip-flop. Returning flip-flop 1.101 to a zero state calibrates the duration of clock pulses derived from temporary clock 39 and blocks any demands on time selector 37 since AND gates 1.102, 1.103 and 1.104 are disabled in response to the binary zero level at output terminal 6 of flip-flop 1.101. Therefore, possible demands on the time selector remain waiting at the input of the time selector until a cycle has been completed. Such a construction increases the security of operation of time selector 37.

As described supra, a risk exists of not satisfying the preparation time of the first stage of flip-flops in time selector 37; in the embodiment of FIG. 2, flip-flops 1.108 and 1.109, and in the embodiment of FIG. 3, flip-flops $\phi 8$, $\phi 9$, 10, 11 and 12. The risk occurs when a demand signal from a particular microprocessor unit or other type of demand source is followed immediately by a demand signal derived by another microprocessor or demand source. In such a case, the output of the first stage flip-flop receiving the second demand reaches a stable state at the end of a stabilization time different from the specified propagation time when the preparation time is guaranteed. To guarantee a risk-free operation during a predetermined, probable minimum fixed period, it is necessary to determine the stabilization time of the flip-flops in the first stage. The probability of an operational risk is virtually zero if the stabilization time is sufficiently large. The stabilization time determines the delay time between input terminal 1 and output terminal 4 of delay element 1.107 (FIG. 2) and delay element 18 (FIG. 3).

Utilization demand signals are supplied to time selector 37 in response to periodic enabling of a flip-flop; in FIG. 2, flip-flop 1.101 is periodically enabled in response to signal VAX 1, while in FIG. 3, flip-flop $\phi 1$ is periodically enabled in response to signal Z. Signal VAX 1 or signal Z is periodically derived from a microprocessor that supplies one of the demand signals to the asynchronous demand selector of FIG. 2 or FIG. 3. Signals VAX 1 and Z respectively enable flip-flops 1.101 and $\phi 1$ periodically at the end of a cycle time T, which can be expressed in nanoseconds. The cycle time is fixed, for example, in the embodiment of FIG. 3, by the calibrated delay of delay element 19 required for pulses to propagate from input terminal 1 to output terminal (P+1) of the delay element. Thus, the time selector responds to the demand signals only every T seconds because of the preparation time phenomenon.

An uncertainty period, designated $t_i$, is defined as the product of a data signal sampling time $\theta$ from the time when the signal should have been produced at the latest to satisfy the preparation time by a non-stabilization probability $p_m$ of a flip-flop under consideration. At worst, the events associated with a failure of the time selector to stabilize are equally probable during cycle time period T. The probability p of a risk appearance is, as a result, equal to:

Equation 1

$$p = \frac{\theta p_m}{T} = \frac{t_i}{T} \quad (1)$$

The probability p of one cycle appearing with a risk among N cycles can be defined as:

Equation 2

$$p = \frac{1}{N} = \frac{1}{D/T} = \frac{T}{D} \quad (2)$$

where:
  D = the time during which there is a probability of a single cycle being spoiled by the risk.

By setting the probabilities in Equations (1) and (2) equal to each other $t_i$ is related to T and D as follows:

Equation 3

$$\frac{t_i}{T} = \frac{T}{D}, \text{ i.e., } t_i = \frac{T^2}{D} \quad (3)$$

Because the cycle time T of the memories associated with the asynchronous demand selector is known, the uncertainty time $t_i$ can be determined exclusively from the period D.

Figure 4:
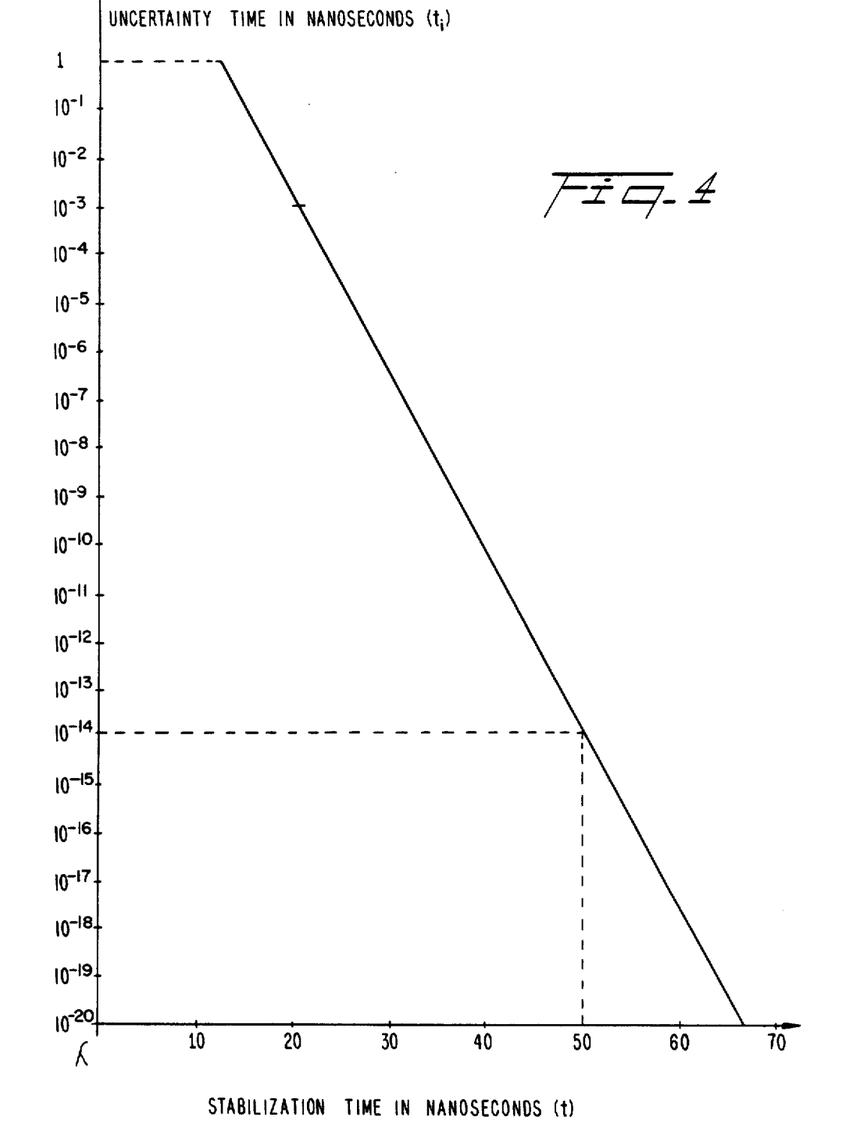
FIGS. 4 and 5 are curves indicating the uncertainty time of flip-flop state changes as a function of flip-flop stabilization time for two different flip-flop types.
Figure 5:
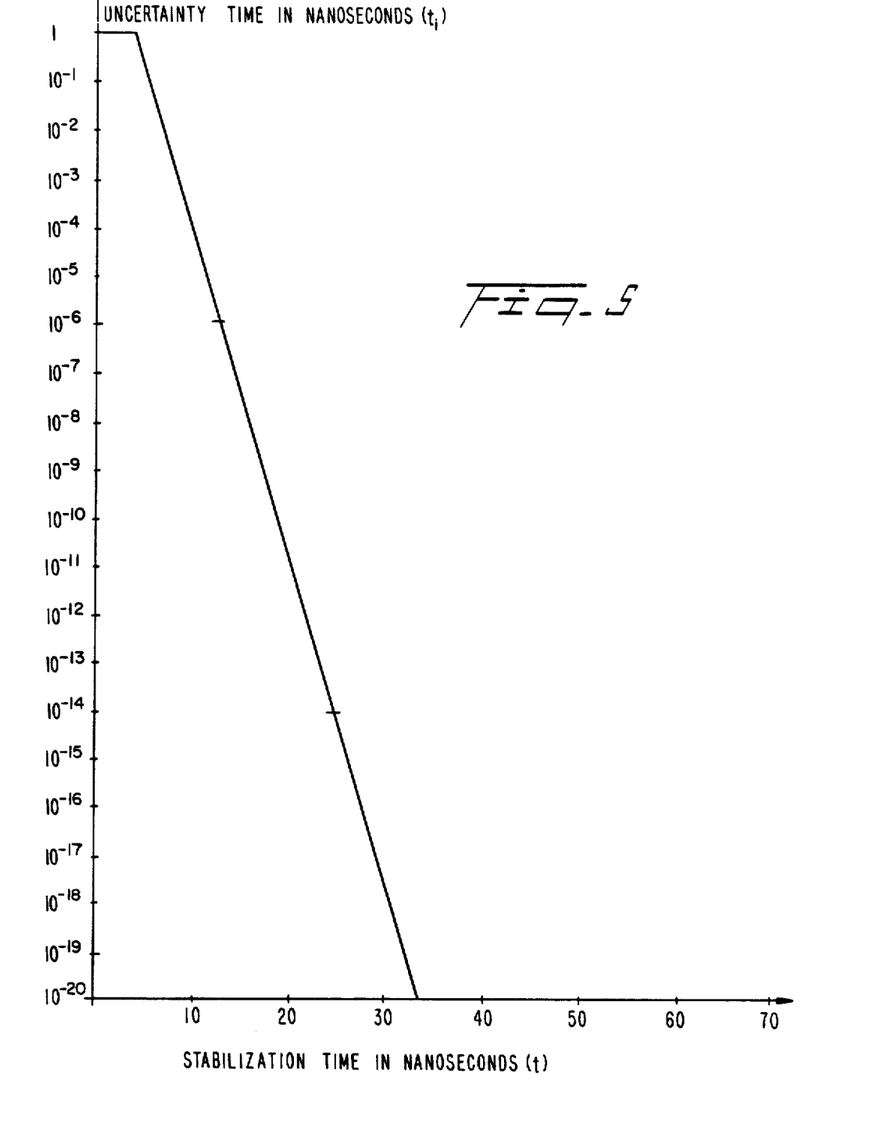

For each type of flip-flop employed in time selector 37, the non-stabilization probability $p_m$ and, consequently, the uncertainty time $t_i$ depends upon the stabilization time of a particular flip-flop. When the stabilization time has expired, the output of a particular flip-flop can be utilized effectively. Probability $p_m$ has been measured as a function of the stabilization time of a particular flip-flop and curves relating the uncertainty time to stabilization time of a particular flip-flop have also been established. FIGS. 4 and 5 respectively are such curves for flip-flops of types SN 74S74 and 10141.

In each of FIGS. 4 and 5, the uncertainty time as a function of the probable period without risk is indicated by the ordinate, while the stabilization time, t, to be measured by fixed conditions is established along the abscissa.

The circuits of time selector 37 also have a self-stabilizing property. In effect, during the entire time period while flip-flop 1.101 or $\phi$1 does not enable any demand to be coupled into the time selector, new demand signals can appear in a totally asynchronous manner, without creating any chance of risk. No chance of risk occurs since the new demand signals are supplied to the time selector only at the completion of the asynchronous demand selector cycle, and then in a perfectly synchronized manner. Therefore, as the demand rate increases, the chance of risk decreases, to greatly improve the security of operation of the apparatus according to the invention.

While there have been described and illustrated several specific embodiments of the invention, it will be clear that variations in the details of the embodiments specifically illustrated and described may be made without departing from the true spirit and scope of the invention as defined in the appended claims.

I claim:

1. Apparatus for controlling a read-write memory having refresh requirements in response to asynchronous read, write and refresh command signals comprising first gate means responsive to the asynchronous read and write command signals, second gate means responsive to the asynchronous read, write and refresh command signals, first circuit means for simultaneously periodically enabling said first and second gate means, said first gate means deriving a first output signal in response to the first gate means being responsive to a read command signal or a write command signal while enabled, said second gate means deriving a second output signal in response to the second gate means being responsive to a read command signal or a write command signal or to a refresh command signal while enabled, multi-tap delay line means having an input terminal responsive to the second output signal and multiple output taps 2, 3, . . . k . . . n at which delayed signals are derived in sequence, where k is selectively each of plural intermediate output taps between taps 3 and n, and n is the last output tap, first and second flip-flops respectively responsive to the first output signal and the refresh command signal while the first and second gate means are enabled and simultaneously responsive to a first timing signal at output tap 2, the delay line having a delay time from the input terminal to output tap 2 commensurate with a predetermined preparation time of the first and second flip-flops, said first and second flip-flops being respectively driven to states commensurate with the first output signal and the refresh command signal while the first and second gate means are enabled at the time the first and second flip-flops respond to the first timing signal, said first circuit means being connected to tap 3 for disabling the first and second gates means in response to a second timing signal derived at tap 3, third and fourth flip-flops respectively responsive to the states of the first and second flip-flops and to a third timing signal derived at a predetermined first one of the k output taps, said third and fourth flip-flops being respectively driven to states commensurate with the states of the first and second flip-flops at the time the third timing signal is derived, third gate means responsive to the states of the third and fourth flip-flops and to a fourth timing signal at a predetermined another one of the k output taps and a fifth timing signal at tap n for deriving synchronized read, write, refresh and no refresh command signals for the memory, the synchronized to refresh signal being derived by the third gate means in response to the fourth timing signal being derived while the third and fourth flip-flops are both in first states commensurate with the unsynchronized read or write signal and the refresh signal being supplied to the apparatus, the synchronized refresh signal being derived by the third gate means in resonse to the fourth timing signal being derived while the third flip-flop is in a second state commensurate with neither the unsynchronized read nor write signal being supplied to the apparatus and the unsynchronized refresh signal being supplied to the apparatus, the synchronized write signal being derived by the third gate means in response to one of the fourth or fifth timing signals being derived while the third flip-flop is in said first state thereof, the synchronized rear signal being derived by the third gate means in response to the other of the fourth or fifth timing signals being derived while the third flip-flop is in said first state thereof, the remaining k taps deriving (k−2) timing signals having a predetermined spacing, said (k−2) timing signals being supplied as input signals to said memory to provide synchronized clocking or signals stored in the memory.

2. Apparatus for controlling a main memory unit of a data processor in response to asynchronous command signals supplied to the data processor by N processor units, where N is an integer greater than one, the main memory unit being divided into N segments so that each segment stores data for a different one of the N processor units, comprising first selectively enabled gate means connected to be simultaneously responsive to the command signals for selectively deriving while enabled (i) N first signals respectively indicative of the presence of the N command signals and (ii) a single second indicative of the presence of any one of the N command signals, first circuit means for periodically enabling said gate means, multi-tap delay line means having an input terminal responsive to the second signal and multiple output taps 2, 3, . . . k . . . n at which delayed signals are derived in sequence, where k is selectively each of plural intermediate output taps between taps 3 and n, and n is the last output tap, N first flip-flops respectively responsive to the N first signals and simultaneously responsive to a first timing signal at output tap 2, the delay line having a delay time from the input terminal to output tap 2 commensurate with a predetermined preparation time of the N first flip-flops, said first N flip-flops being respectively driven to states commensurate with values of the N first signals at the time the N first flip-flops respond to the signal at tap 2, said first circuit means connected to tap 3 for disabling the first gate means in response to a second timing signal derived at tap 3, N second flip-flops respectively simultaneously responsive to the states of the first N flip-flops and to a third timing signal derived at a predetermined first one of the k outut taps, said N second flip-flops being respectively driven to states commensurate with the states of the corresponding N first flip-flops at the time the third timing signal is derived, second gate means simultaneously responsive to N additonal signals derived in response to the states of the N second flip-flops for simultaneously deriving N further signals all of which, except one, have the same value, the excepted further signal being corresponding to the processor unit that is to be controlled by the memory unit, the second gate means being responsive to an additional timing signal derived at one of the k output taps, the N further signals being coupled to the memory unit to enable only the segment of the memory unit corresponding to the processor to be controlled, said delay line means deriving further timing signals having a predetermined spacing, said further timing signals being coupled to the memory unit to provide synchronized clocking of pograms stored in the memory unit.

3. The apparatus of claim 2 further including a priority selection circuit responsive to states of the second flip-flops for deriving multiple input signals for the second gate means.

* * * * *